Dec. 1, 1970  I. JOHNSEN ET AL  3,544,942
THERMALLY ACTUATED SERVO-MOTOR
Filed May 1, 1969
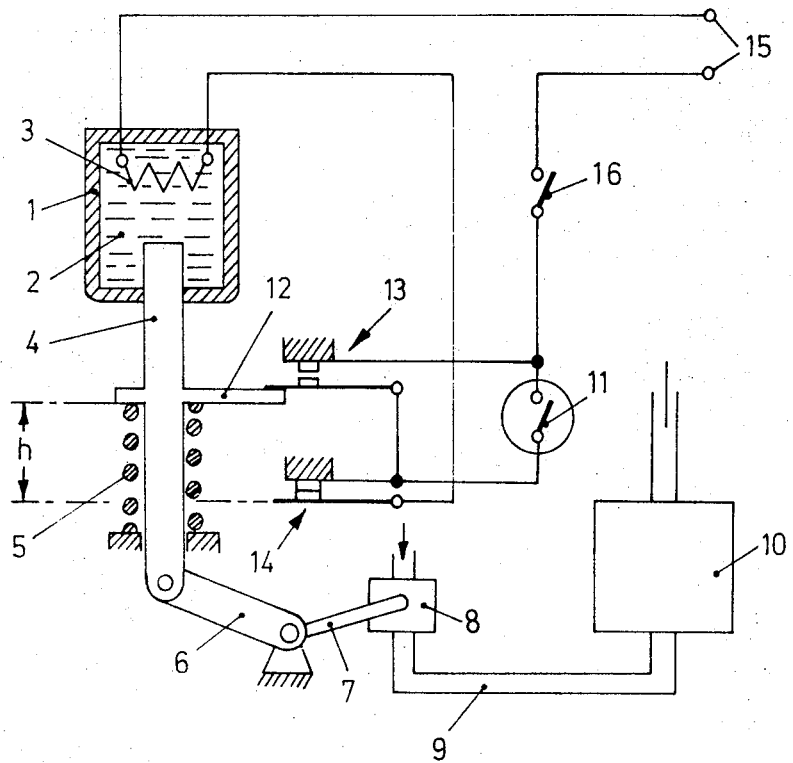

United States Patent Office 3,544,942
Patented Dec. 1, 1970

3,544,942
THERMALLY ACTUATED SERVO-MOTOR
Ingolf Johnsen, Havnbjerg, near Nordborg, and J. Gammelby Jensen, Holm, near Nordborg, Denmark, assignors to Danfoss A/S, Nordborg, Denmark, a company of Denmark
Filed May 1, 1969, Ser. No. 820,773
Claims priority, application Germany, Apr. 19, 1968, 1,751,188
Int. Cl. H01h 37/44, 37/46, 61/00
U.S. Cl. 337—116     3 Claims

ABSTRACT OF THE DISCLOSURE

A thermally actuated servo-motor of the type having a piston that is displaceable by an electrically heatable expansible material and a heating circuit therefor which includes two limit switches. The limit switches are actuatable at each end of the working range of the servo-motor at points just prior to the ends of the stroke. The opposite ends of the working range correspond to "on" and "off" positions. The circuit arrangement functions to selectively maintain either the "on" or "off" position with a continuously cycling intermittent heating operation which maintains the servo-motor in a "warmed up" condition so that it can respond to a control signal immediately without a time lag.

---

The invention relates to a thermally actuated servo-motor incorporating a piston that is displaceable by an electrically heatable expansible material and that, in its end-position, acts on a limit switch contained in the heating-current circuit.

A servo-motor is known, the expansible material of which can be heated as required, and so that the piston cannot be pushed too far outwards there is provided a limit switch which is opened by the piston as soon as the latter has passed beyond a given point during its outward movement. The piston itself thus interrupts the heating-current circuit of the servo-motor. This ensures that the piston cannot pass beyond the end-position determined by the switch.

When thermal capacity is no longer supplied to a servo-motor, the expansible material cools off and the piston executes an inwards movement, sometimes under the effect of a return spring. The non-operating position finally reached by the piston depends upon the extent to which the expansible material is cooled by the ambient temperature. Conversely, a differing amount of heat, depending upon the ambient temperature, must be supplied to the expansible material before the piston reaches its actual working zone. This means that the servo-motor has a non-operative time that is dependent upon the ambient temperature (i.e., upon the period that has elapsed since the last actuation of the system). This is manifested in an unpleasant manner particularly in those cases where the servo-motor is intended for use in a regulating circuit.

The object of the invention is to provide a servo-motor of the above-described kind which has no, or a negligibly small, non-operating time.

According to the invention this object is achieved by a limit switch being normally opened and only closed when the piston reaches a predetermined point during its inward movement resulting from cooling off of the expansible material.

In this arrangement, the inward movement of the piston is interrupted at said point. The expansible material is heated as the result of the closing of the limit switch. The piston moves farther outwards. The switch is thereby opened. The piston again reverses its direction of movement as the result of the cooling off. The piston is therefore held in a desired end-position of its inward movement by intermittent heating. The expansible material has a temperature corresponding to this point. Since the piston is held at the limit of its working range, it responds to any control signal immediately and without any time-lag.

In this way it has become possible for the first time to use such a servo-motor for the purposes of proportional regulation. In particular it can be used for two-position regulation in a regulating circuit. The two-positions can here each be defined by a limit switch one of which corresponds to the known safety switch and the other to the switch of the invention.

As regards the connecting of the system, it is advantageous for the end switch to bridge a control switch such as is normally used for actuating a servo-motor. When two limit switches are used, the first limit switch and the control switch should be arranged in series with the second, normally closed switch associated with the other end-position.

The invention will now be described in more detail by reference to an embodiment illustrated schematically in the drawing. A chamber 1, contains expansible material 2 which, when heated by means of a heating device 3, presses piston 4 outwards against the force of a return spring 5. The movement of the piston is converted, by means of a lever 6, into a rotary movement which, by means of a shaft 7, displaces a flow-control member 8, e.g. a rotary slide. Let it be assumed that this regulates the flow of a heating medium through a pipe 9 to a heating element 10. The room temperature is monitored by a control switch 11 designed as a thermostat.

The piston 4 has an actuating arm 12, which actuates a limit switch 13 in the upper end-position as illustrated, and, after passing through the working range $h$, actuates a switch 14 in the lower end-position. The limit switch 13 is normally open and is closed by the actuating arm 12; the limit switch 14 is normally closed and is opened by the actuating arm 12. The switch 13 bridges the control switch 11. This parallel arrangement is connected in series with the limit switch 14 and the heating device 3 to the supply terminals 15. A main switch 16 can also be provided.

When the control switch 11 is opened, the expansible material 2 cools off and the piston 4 is moved upwards by the return spring 5. When it reaches the upper end-position as illustrated, the actuating arm 12, encounters the limit switch 13 and closes it. The heating-up which then follows drives the piston 4 outwards again, whereupon the switch 13 is re-opened. The result of this is that the piston 4 is retained in the upper end-position as illustrated.

If the control switch 11 is now closed, continuous heating-up takes place, whereby the piston 4 is moved over its working range $h$ into the lower end-position. Here, the limit switch 14 is opened, whereupon the heating is interrupted. Due to the cooling off, the piston reverses its direction of movement, whereupon the switch 14 is closed again. The piston therefore remains in its lower end-position as a result of intermittent heating.

In this way two precisely defined positions for the piston 4 and the flow-control member 8 are obtained, so that perfect two-position regulation can be achieved. Since the piston immediately responds to a control signal no time-lag has to be taken into account, but merely the time required for passage over the working range.

The principle of the limit switch for the inwards movement can also be used in the case of servo-motors which do not have a lower limit switch 14 and/or can occupy intermediate positions due to the use of further switches.

We claim:
1. Thermally actuated servo-motor switch means com- prising wall means defining a chamber, a thermally expansible material in said chamber, a piston in said chamber, piston rod means extending through said wall means, said rod means having switch operating means, an electrically operated heating element for heating said material to cause to and fro movement of said piston and thereby cause said rod means and said switch operating means to move between an extreme "off" position and an extreme "on" position, said rod means having limited movement at one of said positions without altering the "on" or "off" condition, and a limit switch at each of said positions positioned to be actuated prior to the corresponding one of said extreme positions being reached by said rod means.

2. Thermally actuated servo-motor switch means according to claim 1 in which one of said limit switches is bridged by a control switch.

3. Thermally actuated servo-motor switch means according to claim 2 in which said control switch and the other of said limit switches are arranged in series.

References Cited

UNITED STATES PATENTS

| | | | |
|---|---|---|---|
| 3,212,337 | 10/1965 | McCarrick | 337—393X |
| 3,204,066 | 8/1965 | Gordon, Jr. | 337—393 |
| 2,554,534 | 5/1951 | Long et al. | 337—116 |

FOREIGN PATENTS

| | | | |
|---|---|---|---|
| 634,852 | 1/1962 | Canada | 337—393 |

GEORGE HARRIS, Primary Examiner

D. M. MORGAN, Assistant Examiner

U.S. Cl. X.R.

337—311, 315, 393